(12) United States Patent
Ma et al.

(10) Patent No.: US 10,511,457 B2
(45) Date of Patent: Dec. 17, 2019

(54) METHOD, INTELLIGENT DEVICE, AND SYSTEM FOR CONTROLLING TERMINAL DEVICE

(71) Applicant: Tencent Technology (Shenzhen) Company Limited, Shenzhen, Guangdong (CN)

(72) Inventors: Xuemin Ma, Shenzhen (CN); Xuechao Li, Shenzhen (CN); Liangliang Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 78 days.

(21) Appl. No.: 15/681,921

(22) Filed: Aug. 21, 2017

(65) Prior Publication Data

US 2017/0346654 A1 Nov. 30, 2017

Related U.S. Application Data

(63) Continuation of application No. PCT/CN2016/084482, filed on Jun. 2, 2016.

(30) Foreign Application Priority Data

Jul. 15, 2015 (CN) .......................... 2015 1 0417510

(51) Int. Cl.
*H04L 12/28* (2006.01)
*H04L 29/06* (2006.01)
(Continued)

(52) U.S. Cl.
CPC .......... *H04L 12/2816* (2013.01); *H04L 29/06* (2013.01); *H04L 29/08099* (2013.01);
(Continued)

(58) Field of Classification Search
CPC ................. H04L 12/2816; H04L 29/06; H04L 29/08099; H04W 4/50; H04W 4/06
See application file for complete search history.

(56) References Cited

U.S. PATENT DOCUMENTS

| 2009/0234958 | A1* | 9/2009 | Lee .......................... H04L 29/06 709/230 |
| 2010/0318599 | A1* | 12/2010 | Yun .......................... G06F 9/54 709/203 |

(Continued)

FOREIGN PATENT DOCUMENTS

| CN | 103023681 A | 4/2013 |
| CN | 103379154 A | 10/2013 |

(Continued)

OTHER PUBLICATIONS

International Search Report and Written Opinion dated Sep. 1, 2016 for PCT Application No. PCT/CN2016/084482, 12 pages.

*Primary Examiner* — Thomas C Lee
*Assistant Examiner* — Michael Tang
(74) *Attorney, Agent, or Firm* — Brinks Gilson & Lione

(57) ABSTRACT

A method, device, and system for controlling a terminal device are disclosed. The method includes: traversing, by the intelligent device, pre-stored correspondences between control triggering requests and terminal devices in response to a control triggering request, to search multiple terminal devices for a target device corresponding to the control triggering request; determining whether a control protocol of the intelligent device is consistent with a control protocol of the target device when the intelligent device and the target device are in a connected state; when the control protocol of the intelligent device is consistent with the control protocol of the target device, receiving an input instruction and performing operation control on the target device according to the input instruction. By means of this application, effective intelligent control by an intelligent device on a terminal device such as a computer is implemented, and a requirement of a user is satisfied.

14 Claims, 11 Drawing Sheets

PC terminal

Intelligent device

User

(51) Int. Cl.
*H04L 29/08* (2006.01)
*H04W 4/06* (2009.01)
*H04W 4/50* (2018.01)

(52) U.S. Cl.
CPC ............ *H04L 67/025* (2013.01); *H04W 4/06* (2013.01); *H04W 4/50* (2018.02)

(56) References Cited

U.S. PATENT DOCUMENTS

| | | | |
|---|---|---|---|
| 2012/0151589 A1 | 6/2012 | Hershey et al. | |
| 2013/0198638 A1* | 8/2013 | Na | H04L 67/16 715/736 |
| 2014/0181199 A1* | 6/2014 | Kumar | H04W 4/043 709/204 |
| 2015/0162006 A1* | 6/2015 | Kummer | G07C 9/00571 704/275 |
| 2015/0261427 A1* | 9/2015 | Sasaki | G06F 3/04817 715/736 |
| 2015/0277683 A1* | 10/2015 | Eteminan | H04L 67/306 715/745 |
| 2016/0051192 A1* | 2/2016 | Kang | A61B 5/002 600/364 |
| 2016/0156768 A1* | 6/2016 | Kim | H04L 67/12 455/420 |
| 2016/0337144 A1* | 11/2016 | Kim | H04L 12/2816 |

FOREIGN PATENT DOCUMENTS

| | | |
|---|---|---|
| CN | 103561044 A | 2/2014 |
| CN | 104270662 A | 1/2015 |
| CN | 104683470 A | 6/2015 |

\* cited by examiner

METHOD, INTELLIGENT DEVICE, AND SYSTEM FOR CONTROLLING TERMINAL DEVICE

CROSS-REFERENCE TO RELATED APPLICATION

This application is a continuation application of PCT Patent Application No. PCT/CN2016/084482, filed on Jun. 2, 2016, which claims priority to Chinese Patent Application No. 201510417510.3, filed with the Chinese Patent Office on Jul. 15, 2015, both of which are incorporated herein by reference in their entireties.

FIELD OF THE TECHNOLOGY

This application relates to the field of computer network technologies, and in particular, to a method, an intelligent device, and a system for controlling a terminal device.

BACKGROUND OF THE DISCLOSURE

With unceasing scientific and technological progress and continuous improvement of people's living standard, various household appliances (for example, a refrigerator, an air conditioner, a television, and a personal computer) are already intelligent and enter numerous households. It is known that a user usually needs to control these household appliances by using a dedicated remote controller or by directly using operation keys provided on these household appliances.

SUMMARY

Embodiments of this application provide a method, an intelligent device, and a system for controlling a terminal device, to implement effective control on a terminal device by using an intelligent device.

To achieve the foregoing objective, an embodiment of this application provides a method for controlling a terminal device by using an intelligent device, applied to a device that is for controlling a terminal device and that is located in a first area, and including:

in response to a control triggering request, traversing, by an intelligent device comprising a memory and a processor in communication with the memory, pre-stored correspondences between control triggering requests and terminal devices, to search multiple terminal devices for a target device corresponding to the control triggering request;

determining, by the intelligent device, whether a control protocol of the intelligent device is consistent with a control protocol of the target device when the intelligent device and the target device are in a connected state; and when it is determined that the control protocol of the intelligent device is consistent with the control protocol of the target device, receiving, by the intelligent device, an input instruction and performing, by the intelligent device, operation control on the target device according to the input instruction.

An embodiment of this application further provides an intelligent device for controlling a terminal device, including:

a memory storing instructions;

a processor in communication with the memory, wherein, when the processor executes the instructions, the processor is configured to cause the intelligent device to:

traverse, in response to a control triggering request, pre-stored correspondences between control triggering requests and terminal devices, to search multiple terminal devices for a target device corresponding to the control triggering request;

determine whether a control protocol of the intelligent device is consistent with a control protocol of the target device when the intelligent device and the target device are in a connected state; and when it is determined that the control protocol of the intelligent device is consistent with the control protocol of the target device, receive an input instruction, and perform operation control on the target device according to the input instruction.

An embodiment of this application further provides a system for controlling a terminal device by using an intelligent device, including:

multiple terminal devices; and an intelligent device, comprising:

a memory storing instructions;

a processor in communication with the memory, wherein, when the processor executes the instructions, the processor is configured to cause the intelligent device to:

traverse, in response to a control triggering request, pre-stored correspondences between control triggering requests and terminal devices, to search multiple terminal devices for a target device corresponding to the control triggering request;

determine whether a control protocol of the intelligent device is consistent with a control protocol of the target device when the intelligent device and the target device are in a connected state; and when it is determined that the control protocol of the intelligent device is consistent with the control protocol of the target device, receive an input instruction, and perform operation control on the target device according to the input instruction; and wherein the target device is configured to:

create a communications module, establish a connection to the intelligent device by using the communications module, receive the input instruction sent by the intelligent device, and perform the operation control according to the input instruction.

The embodiments of this application provide a method, an intelligent device, and a system for controlling a terminal device. The intelligent device traverses pre-stored correspondences between control triggering requests and terminal devices in response to a control triggering request, to search multiple terminal devices for a target device corresponding to the control triggering request. The intelligent device determines whether a control protocol of the intelligent device is consistent with a control protocol of the target device when the intelligent device and the target device are in a connected state. The intelligent device receives an input instruction when the control protocol of the intelligent device is consistent with the control protocol of the target device. The intelligent device performs operation control on the target device according to the input instruction. In this way, effective control on a terminal device is implemented, and a requirement of a user on flexible intelligent control on the terminal device is satisfied.

DESCRIPTION OF EMBODIMENTS

It should be understood that, the specific embodiments described herein are merely intended to explain this application, rather than to limit this application.

In the embodiments of the present application, an intelligent device establishes wireless connections to communications modules of terminal devices in a same wireless local area network, selects a target device in the wireless local area network, performs type matching on the selected target device, and presents a corresponding operation control interface according to a matching result; receives an input instruction of a user on the corresponding operation control interface; and performs operation control on the selected target device according to the input instruction of the user. In this way, an input operation of a user on an intelligent device is converted into an input operation on a terminal device, thereby implementing effective intelligent control on the terminal device by using the intelligent device.

In the embodiments of this application, it is considered that a terminal device (a computer is used as an example) such as a computer cannot be effectively controlled by using a current mobile phone. For example, the mobile phone generally needs to be connected to the computer by using a data cable. However, when there is a relatively long distance between the mobile phone of a user and the computer, the requirement of the user for controlling an operation of the computer by using the mobile phone cannot be satisfied.

In view of this, the embodiments of this application provide a solution, which can implement effective control on a terminal device by using an intelligent device, and satisfy a requirement of a user.

Figure 1:
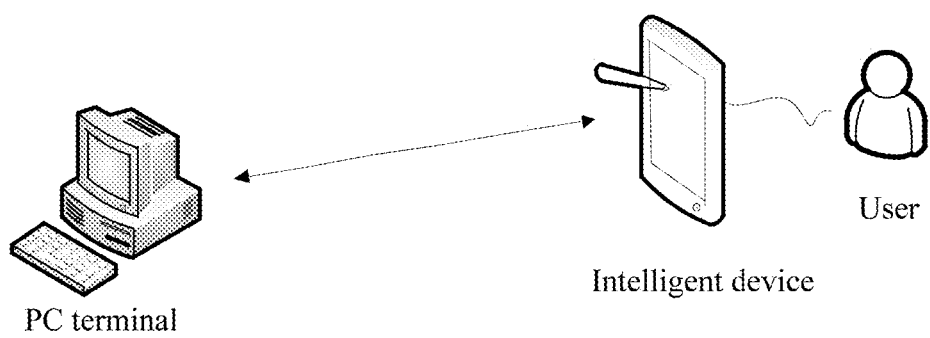
FIG. 1 is a schematic diagram of a system architecture involved in a solution in an embodiment of this application.

A system architecture involved in a solution of an embodiment may be shown in FIG. 1. The system architecture includes an intelligent device and a terminal device. The intelligent device may be specifically as a mobile phone, a tablet computer, or a portable device. The terminal device may be an intelligent device such as a computer, an air conditioner, or a refrigerator. A computer is used as an example in this embodiment. In this embodiment of the present application, the intelligent device may be located in a first area, and the terminal device may be located in a second area.

The intelligent device is configured to select a to-be-controlled target device from multiple target devices.

In an embodiment of the present application, the intelligent device may perform type matching on the selected target device, and presents a corresponding operation control interface according to a matching result; receives an input instruction on the corresponding operation control interface; and performs operation control on the selected target device according to the input instruction. In this embodiment of the present application, the input instruction may be an input instruction of a user or an input instruction that is sensed by the intelligent device by using a sensor, for example, a gravity sensor.

In an embodiment of the present application, the intelligent device may communicate with the terminal device by using a cable and/or a wireless network.

The wireless network may include: a wireless personal area network (WPAN), a wireless local area network (WLAN), a wireless wide area network (WWAN), a general packet radio service (GPRS) network, a wideband code division multiple access, (WCDMA) network, or the like.

The WPAN may include: a Bluetooth network, a ZigBee network, a ultra-wideband (UWB) network, an infrared (IrDA) network, or a home radio frequency (HomeRF) network.

The wireless local area network may be a wireless network such as a Wireless Fidelity (WiFi) network or a Near Field Communication (NFC) network. A WiFi network is used as an example in this embodiment.

WiFi is a technology that can wirelessly connect terminals such as a personal computer and a handheld device (for example, a PDA or a mobile phone) with each other. WiFi is a brand of a wireless network communications technology, is owned by the WiFi Alliance, and aims to improve interconnectivity among wireless network products that are based on the IEEE 802.11 standard.

In this embodiment, the intelligent device searches for a communications module or a communications server in a same WiFi network. If the searching succeeds, the intelligent device connects to the communications module through WiFi Direct. The communications module is borne on a terminal device such as a computer, an air conditioner, or a refrigerator.

WiFi Direct, which was referred as Wi-Fi Peer-to-Peer, is a set of software protocols that allow a WiFi device to be directly connected to another WiFi device in a peer-to-peer manner for high-speed data transmission rather than via a wireless network base station (access point).

The terminal device is configured to: create a communications module, establish a wireless connection in a wireless local area network to the intelligent device, receive an input instruction of a user that is sent by the intelligent device, and perform operation control on the terminal device according to the input instruction of the user.

The communications module is a functional module on the terminal device that can wirelessly communicate with the intelligent device, and is configured to provide a communications service for a user on the network that needs to transfer a file or access information in a remote system or on a remote network by using a remote communications link. In another embodiment, the communications module may also a software server or a software communications device than can wirelessly communicate with the intelligent device and is configured to provide a communications service for a user on the network that needs to transfer a file or access information in a remote system or on a remote network by using a remote communications link. The communications module is used as an example in this embodiment.

Further, the terminal device is further configured to: search a preset action encoding mapping table after receiving encoded data by using the communications module, to obtain an input instruction corresponding to the encoded data, where the input instruction includes an input operation of the user and additional information of the operation; and convert the input operation of the user into an input operation on the terminal device, call a corresponding system API function in combination with the additional information of the operation, to perform operation control on the terminal device.

It can be known from the system architecture that, in the solution of this embodiment, an intelligent device selects a target device in a wireless local area network; performs type matching on the selected target device, and presents a corresponding operation control interface according to a matching result; receives an input instruction of a user on the corresponding operation control interface; and performs operation control on the selected target device according to the input instruction of the user. In this way, effective control on a terminal device is implemented by using an intelligent device, and a requirement of a user for flexible intelligent control on the terminal device is satisfied.

An intelligent device that implements embodiments of this application is described below with reference to the accompanying drawings. In the subsequent description, suffixes such as "module", "component", or "unit" that are used to represent elements are only used for ease in description of this application, and the suffixes have no specific meaning. Therefore, "module" and "component" may be mixed.

The intelligent device may be implemented in various forms. For example, the terminal described in this application may include an intelligent device such as a mobile phone, a smart phone, a laptop computer, a digital broadcast receiver, a personal digital assistant (PDA), a tablet computer (PAD), a portable multimedia player (PMP), a wearable device (for example, a smart band or a smart watch), or a navigation device.

Figure 2:
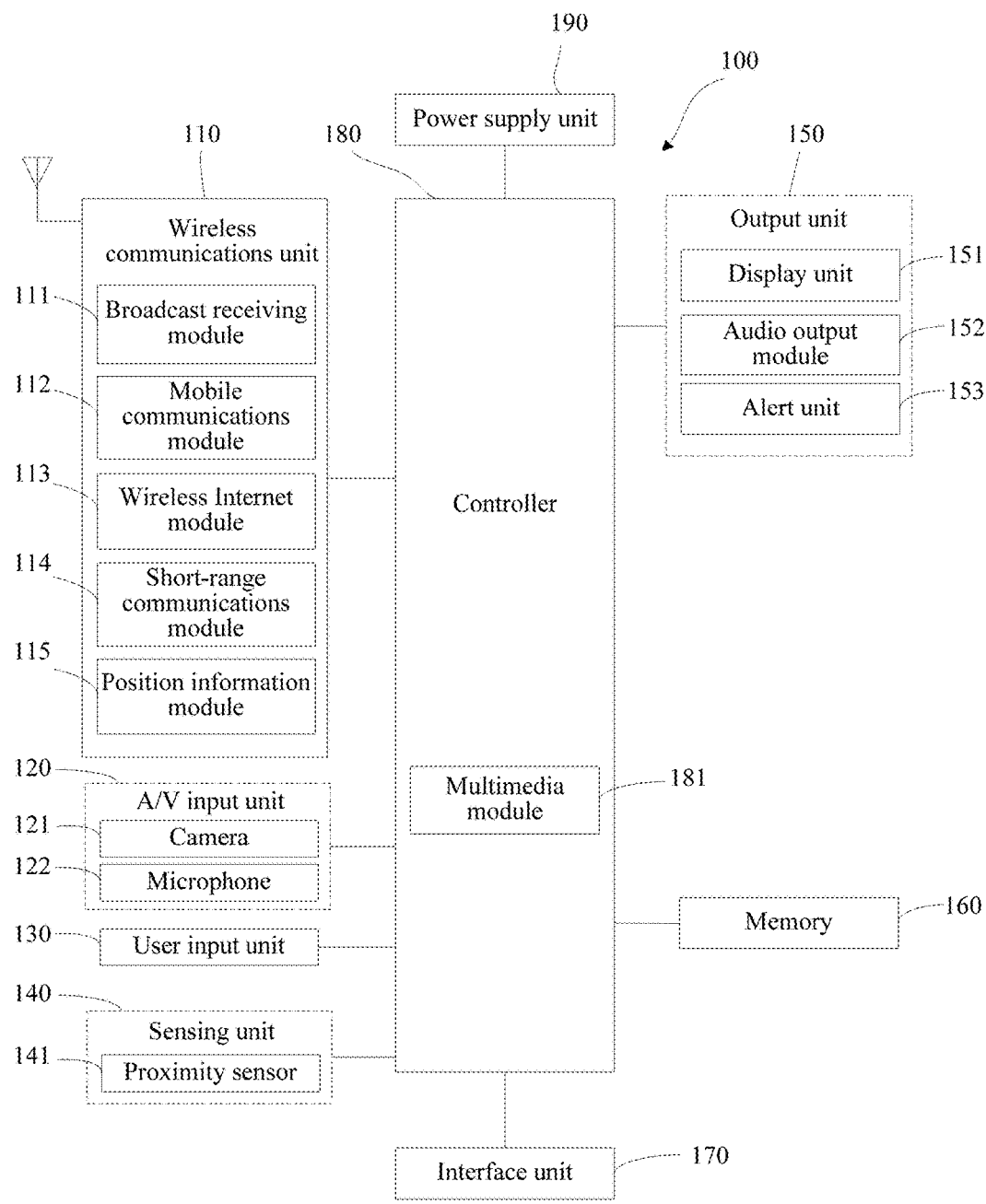
FIG. 2 is a schematic diagram of a hardware structure of an intelligent device involved in a solution in an embodiment of this application.

As shown in FIG. 2, FIG. 2 is a schematic diagram of a hardware structure of an intelligent device according to embodiments of this application.

The intelligent device 100 includes a wireless communications unit 110, an audio/video (A/V) input unit 120, a user input unit 130, a sensing unit 140, an output unit 150, a memory 160, an interface unit 170, a controller 180, a power supply unit 190, and the like.

FIG. 2 shows the intelligent device having the various components. However, it should be understood that not all the shown components need to be implemented. More or fewer components may be alternatively implemented. The elements of the intelligent device are described in detail below.

The wireless communications unit 110 generally includes one or more components, and allows radio communications between the intelligent device 100 and a wireless communications system or a network. For example, the wireless communications unit may include at least one of a broadcast receiving module 111, a mobile communications module 112, a wireless Internet module 113, a short-range communications module 114, or a position information module 115.

The broadcast receiving module 111 receives a broadcast signal from an external broadcast management server and/or broadcasts related information by using a broadcast channel. The broadcast channel may include a satellite channel and/or a ground channel. The broadcast management server may be a server that generates and sends a broadcast signal and/or broadcasts related information, or a server that receives a previously generated broadcast signal and/or broadcasts related information and sends the related information to a terminal. The broadcast signal may include a TV broadcast signal, a radio broadcast signal, a data broadcast signal, or the like. In addition, the broadcast signal may further include a broadcast signal combined with a TV broadcast signal or a radio broadcast signal. The broadcast of the related information may also be provided by using a mobile communications network, and in this case, the broadcast related information may be received by the mobile communications module 112. The broadcast signal may exist in various forms. For example, the broadcast signal may exist in a form such as an electronic program guide (EPG) of Digital Multimedia Broadcasting (DMB) or an electronic service guide (ESG) of Digital Video Broadcasting-Handheld (DVB-H). The broadcast receiving module 111 may receive a signal broadcast by using various types of broadcast systems. Particularly, the broadcast receiving module 111 may receive a digital broadcast by using a data broadcast system for, for example, Digital Multimedia Broadcasting-Terrestrial (DMB-T), Digital Multimedia Broadcasting-Satellite (DMB-S), Digital Video Broadcasting-Handheld (DVB-H), or Forward Link Only (MediaFLO®), or by using a digital broadcast system for, for example, Integrated Services Digital Broadcasting-Terrestrial (ISDB-T). The broadcast receiving module 111 may be configured to be suitable for various broadcast systems providing broadcast signals and the foregoing digital broadcast systems. A broadcast signal and/or broadcast related information received by using the broadcast receiving module 111 may be store in the memory 160 (or a storage medium of another type).

The mobile communications module 112 sends a radio signal to or receives a radio signal from any one of a base station (for example, an access point or a node B), an external terminal, or a server. Such a radio signal may include a voice communications signal, a video communications signal, or various types of data sent and/or received according to a text message and/or a multimedia message.

The wireless Internet module 113 supports wireless Internet access of the intelligent device. The module may be internally or externally coupled to the terminal. A wireless Internet access technology involved in the module may include a wireless local area network (WLAN), Wireless Fidelity (WiFi), wireless broadband (Wibro), Worldwide Interoperability for Microwave Access (WiMAX), or High Speed Downlink Packet Access (HSDPA).

The short-range communications module 114 is a module configured to support short-range communication. Some examples of short-range communications technologies include Bluetooth®, radio frequency identification (RFID), Infrared Data Association (IrDA), ultra-wideband (UWB), and ZigBee®.

The position information module 115 is a module configured to check or obtain position information of the intelligent device. A typical example of the position information module is the Global Positioning System (GPS). According to existing technologies, a GPS module calculates distance information and accurate time information from three or more satellites, and applies a triangulation method to the calculated information, so as to accurately calculate current position information according to a longitude, a latitude, and a height. Currently, in a method for calculating the position information and the time information, three satellites are used and another satellite is used to rectify errors in the calculated position information and time information. In addition, the GPS module can calculate speed information by continuously calculating the current position information in real time.

The A/V input unit 120 is configured to receive an audio signal or a video signal. The A/V input unit 120 may include a camera 121 and a microphone 122. The camera 121 processes image data of a static picture or a video that is obtained by an image acquisition apparatus in a video acquisition mode or an image acquisition mode. An image frame that has been processed may be displayed on a display unit 151. The image frame that has been processed by the camera 121 may be stored in the memory 160 (or another storage medium) or sent by using the wireless communications unit 110. Two or more cameras 121 may be provided according to a structure of the intelligent device. The microphone 122 may receive a sound (audio data) in an operation mode such as a telephone call mode, a record mode, or a voice recognition mode by using the microphone, and can process the sound into audio data. The audio (voice) data that has been processed may be converted, in the telephone call mode, into a format that can be sent to a mobile communications base station by using the mobile communications module 112 and be output. The microphone 122 may implement various types of noise cancelling (or suppression) algorithms to cancel (or suppress) noise or interference that is generated in a process of receiving and sending an audio signal.

The user input unit 130 may generate key input data according to a command input by a user, to control various operations of the intelligent device. The user input unit 130 allows the user to input various types of information, and may include a keyboard, a metal dome, a touch panel (for example, a touch-sensitive component that detects a change in resistance, press, capacitance, or the like resulted from a touch), a wheel, a joystick, and the like. Particularly, when touch panels are superposed on the display unit 151 in the form of layers, a touchscreen may be formed.

The sensing unit 140 detects a current state of the intelligent device 100 (for example, an open or closed state of the intelligent device 100), a position of the intelligent device 100, whether there is a touch (that is, a touch input) of the user on the intelligent device 100, an orientation of the intelligent device 100, an acceleration or deceleration movement and direction of the intelligent device 100, or the like, and generates a command or a signal used to control an operation of the intelligent device 100. For example, when the intelligent device 100 is implemented as a slide-type mobile phone, the sensing unit 140 may sense whether the slide-type phone is being opened or closed. In addition, the sensing unit 140 can detect whether the power supply unit 190 provides power or whether the interface unit 170 is coupled to an external apparatus. The sensing unit 140 may include a proximity sensor 141, which is described below in combination with a touchscreen.

The interface unit 170 is used as an interface through which at least one external apparatus and the intelligent device 100 may be connected. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The identification module may store various information used to authenticate the user when the user uses the intelligent device 100, and may include a user identification module (UIM), a subscriber identification module (SIM), a universal subscriber identification module (USIM), or the like. In addition, an apparatus having the identification module (referred to as an "identification apparatus" below) may be in the form of a smart card. Therefore, the identification apparatus may be connected to the intelligent device 100 by using a port or another connection apparatus. The interface unit 170 may be configured to receive an input (for example, data information or power) from an external apparatus, and transmit the received input to one or more elements in the intelligent device 100, or may be configured to transmit data between the intelligent device and the external apparatus.

In addition, when the intelligent device 100 is connected to an external base, the interface unit 170 may be used as a path that allows power to be supplied to the intelligent device 100 from the base through the path, or may be used as a path that allows various command signals that are input from the base to be transmitted to the intelligent device. The various command signals or power that is input from the base may be used as a signal for detecting whether the intelligent device is correctly installed on the base. The output unit 150 is configured to provide an output signal (for example, an audio signal, a video signal, an alert signal, or a vibration signal) in a visual, audio, and/or tactile manner. The output unit 150 may include a display unit 151, an audio output module 152, an alert unit 153, and the like.

The display unit 151 may display information processed on the intelligent device 100. For example, when the intelligent device 100 is in the telephone call mode, the display unit 151 may display a user interface (UI) or a graphical user interface (GUI) related to a call or other communications (for example, text message receiving and sending and multimedia file downloading). When the intelligent device 100 is in the video call mode or the image acquisition mode, the display unit 151 may display an acquired image and/or a received image, show a UI or GUI related to a video or an image and related functions, and the like.

In addition, when the display unit 151 and the touch panel are superposed on each other in the form of layers to form a touchscreen, the display unit 151 may be used as an input apparatus and an output apparatus. The display unit 151 may include at least one of a liquid crystal display (LCD), a thin film transistor liquid crystal display (TFT-LCD), an organic light emitting diode (OLED) display, a flexible display, or a three-dimensional (3D) display. Some of these displays may be constructed as transparent to allow a user to view the displays from the outside, which can be referred to as transparent displays. A typical transparent display may be, for example, a transparent organic light emitting diode (TOLED) display. According to a specific desired implementation, the intelligent device 100 may include two or more display units (or another display apparatus). For example, the intelligent device may include an external display unit (not shown) and an internal display unit (not shown). The touchscreen may be configured to detect a touch input press and a touch input position and a touch input area.

The audio output module 152 may convert, when the intelligent device is in a call signal receiving mode, the call mode, the record mode, the voice recognition mode, a broadcast receiving mode, or the like, the audio data that is received by the wireless communications unit 110 or stored in the memory 160 into audio signals and output the audio signals as a sound. In addition, the audio output module 152 may provide an audio output that is related to a particular function executed by the intelligent device 100 (for example, a call signal receiving sound or a message receiving sound). The audio output module 152 may include a loudspeaker, a buzzer, or the like.

The alert unit 153 may provide an output to notify the intelligent device 100 of occurrence of an event. A typical event may include call receiving, message receiving, a key signal input, a touch input, or the like. In addition to an audio output or a video output, the alert unit 153 may provide an output in different forms to notify occurrence of an event. For example, the alert unit 153 may provide an output in the form of a vibration. When receiving a call, a message, or some other incoming communications, the alert unit 153 may provide a tactile output (that is, a vibration) to notify the user of the event. By providing such a tactile output, even when a mobile phone of a user is in a pocket of the user, the user can still identify occurrences of various events. The alert unit 153 may also provide, by using the display unit 151 or the audio output module 152, an output notifying occurrence of an event.

The memory 160 may store a software program that is executed by a controller 180 to process and control operations, or the like, or may temporarily store data (for example, a telephone book, a message, a static image, or a video) that has been output or to be output. In addition, the memory 160 may store data of various forms of vibrations and audio signals that are output when touches are applied to the touchscreen.

The memory 160 may include at least one type of storage medium. The storage medium includes a flash memory, a hard disk drive, a multimedia card, a card-type memory (for example, an SD memory or a DX memory), a random access memory (RAM), a static random access memory (SRAM), a read-only memory (ROM), an electrically erasable programmable read only memory (EEPROM), a programmable read-only memory (PROM), a magnetic memory, a magnetic disk, an optical disk, or the like. In addition, the intelligent device 100 may cooperate with a network storage apparatus that executes a storage function of the memory 160 by using a network connection.

The controller 180 generally controls an overall operation of the intelligent device. For example, the controller 180 performs control and processing related to a voice call, data communication, a video call, or the like. In addition, the controller 180 may include a multimedia module 181 configured to reproduce (or replay) multimedia data. The multimedia module 181 may be constructed inside the controller 180, or may be constructed as separate from the controller 180. The controller 180 may perform pattern recognition processing, to recognize a handwriting input or a picture drawing input performed on the touchscreen as a character or an image.

Under the control of the controller 180, the power supply unit 190 receives external power or internal power and provides suitable power for operating the elements and the components.

The various implementations described herein may be implemented by using, for example, a computer readable medium including computer software, computer hardware, or any combination thereof. For a hardware implementation, the implementations described herein may be implemented by using at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, an electronic unit designed to perform the function described herein. In some cases, such an implementation may be implemented in the controller 180. For a software implementation, an implementation of a process or a function may be implemented by using a separate software module that allows at least one function or operation to be performed. Software code may be implemented by using a software application program (or program) written in any appropriate programming language, and the software code may be stored in the memory 160 and executed by the controller 180.

By now, the intelligent device has been described according to the functions of the intelligent device.

For brevity, a slide-type intelligent device among various types of intelligent devices such as a folded-type intelligent device, a bar-type intelligent device, a swing-type intelligent device, and a slide-type intelligent device is described below as an example. Therefore, this application can be applied to any type of intelligent device, not limited to the slide-type intelligent device.

The intelligent device 100 shown in FIG. 2 may be configured to operate by using, for example, a wired communications system, a wireless communications system, and a satellite-based communications system in which data is sent by using a frame or a packet.

A communications system in which the intelligent device according to this application can operate is now described with reference to FIG. 3.

Such a communications system may use different air interfaces and/or physical layers. For example, an air interface used by the communications system includes, for example, frequency division multiple access (FDMA), time division multiple access (TDMA), code division multiple access (CDMA), universal mobile telecommunications system (UMTS) (particularly, Long Term Evolution (LTE)), or Global System for Mobile Communications (GSM). As a non-restrictive example, a CDMA communications system is involved in the following description, but the teaching is also applicable to other types of systems.

Figure 3:
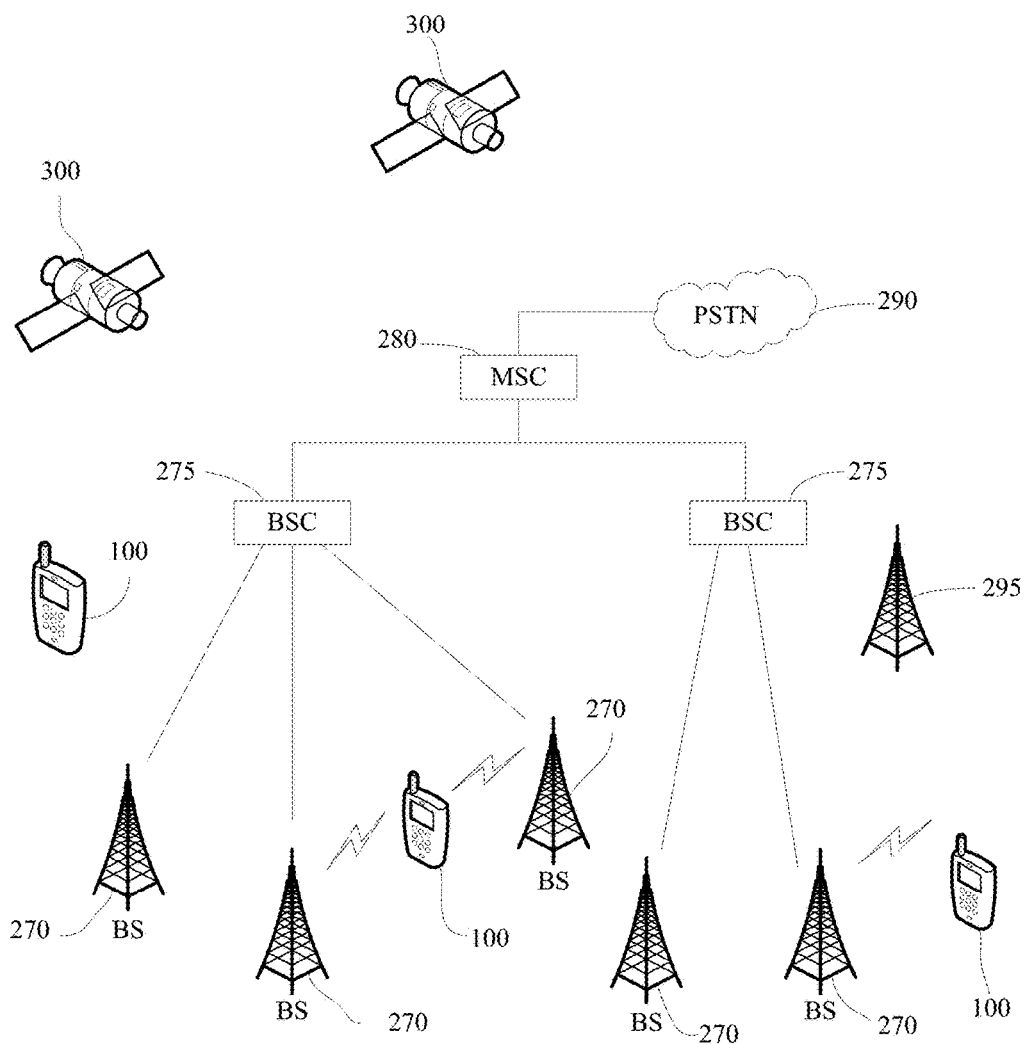
FIG. 3 is a schematic diagram of a wireless communications system for the intelligent device shown in FIG. 2.

Referring to FIG. 3, the CDMA wireless communications system may include multiple intelligent devices 100, multiple base stations (BS) 270, at least one base station controller (BSC) 275, and a mobile switching center (MSC) 280. The MSC 280 is configured to form an interface with a public switched telephone network (PSTN) 290. The MSC 280 is further configured to be coupled to the BSC 275 of the base stations 270 by using a backhaul line to form an interface. The backhaul line may be constructed according to any one of several known interfaces, and the interfaces include, for example, E1/T1, ATM, IP, PPP, frame relay, HDSL, ADSL, or xDSL. It should be understood that, the system shown in FIG. 3 may include multiple BSs 270.

Each BS 270 may serve one or more sections (or areas), and each section covered by an omni-directional antenna or an antenna directing to a particular direction radially departs from the BS 270. Alternatively, each section may be covered by two or more antennas for diversity receiving. Each BS 270 may be configured to support multiple frequency allocations, and each frequency allocation has a particular frequency spectrum (for example, 1.25 MHz or 5 MHz).

A cross between a section and a frequency allocation may be referred to as a CDMA channel. The BSs 270 may also be referred to as base transceiver stations (BTS) or another equivalent term. In such cases, the term "base station" may be used to collectively represent a single BSC 275 and at least one BS 270. The base station may also be referred to as a "cellular station". Alternatively, sections of a particular BS 270 may be referred to as multiple cellular stations.

As shown in FIG. 3, a broadcast transmitter (BT) 295 sends a broadcast signal to the intelligent devices 100 operating in the system. The broadcast receiving modules 111 shown in FIG. 2 are set on the intelligent devices 100 to receive the broadcast signal sent by the BT 295. In FIG. 3, several Global Positioning System (GPS) satellites 300 are shown. The satellites 300 help to position at least one of the multiple intelligent devices 100.

In FIG. 3, multiple satellites 300 are described. However, it should be understood that, useful positioning information may be obtained by using any quantity of satellites. The GPS module shown in FIG. 2 is usually configured to cooperate with the satellites 300 to obtain desired positioning information. As an alternative to a GPS tracking technology or in addition to the GPS tracking technology, another technology that can be used to track a position of an intelligent device may be used. In addition, at least one GPS satellite 300 may optionally or additionally process satellite DMB transmission.

As a typical operation of the wireless communications system, the BSs 270 receive reverse link signals from the various types of intelligent devices 100. The intelligent devices 100 usually participate in a call, message receiving and sending, and other types of communication. Each reverse link signal received by a particular base station 270 is processed inside the particular BS 270. Obtained data is forwarded to a related BSC 275. The BSC provides call resource allocation and a mobility management function including coordination of a soft switching process among the BSs 270. The BSC 275 further routes received data to the MSC 280, and the MSC 280 provides an additional routing service for forming an interface with the PSTN 290. Similarly, the PSTN 290 and the MSC 280 form an interface, the MSC and the BSC 275 form an interface, and the BSC 275 correspondingly controls the BSs 270 to send forward link signals to the intelligent devices 100.

Based on the foregoing system architecture, the hardware structure of the intelligent device, and the communications system, an embodiment of a method for controlling a terminal device by using an intelligent device according to this application is provided.

Figure 4:
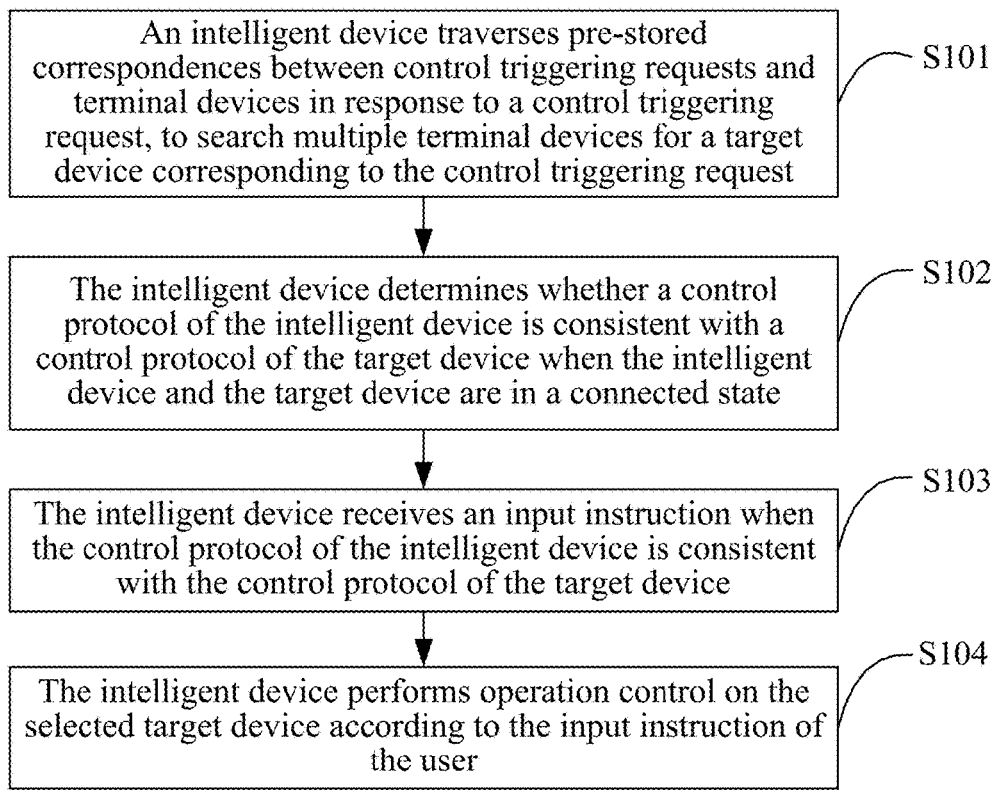
FIG. 4 is a flowchart of an embodiment of a method for controlling a terminal device by using an intelligent device according to this application.

As shown in FIG. 4, an embodiment of this application provides a method for controlling a terminal device by using an intelligent device, including the following steps:

Step S101. The intelligent device traverses pre-stored correspondences between control triggering requests and terminal devices in response to a control triggering request, to search multiple terminal devices for a target device corresponding to the control triggering request. The intelligent device may include a CPU or processor and a memory in communication with the processor, wherein the memory has stored therein executable instructions for the processor.

The intelligent device may select one terminal device from terminal devices in a same local area network as the target device according to a need of a user for controlling a terminal device.

When selecting the target device, the intelligent device may obtain a communications module of the target device by means of searching, to establish a communications connection to the target device.

In an embodiment of the present application, the intelligent device may be used to control multiple terminal devices. Therefore, the intelligent device is provided with a trigger interface corresponding to each controlled terminal device. When a particular trigger interface is triggered, the intelligent device generates a control triggering request, for example, an operation code. The intelligent device stores a correspondence between each controlled terminal device and a control triggering request, searches for a terminal device corresponding to the control triggering request, considers the terminal device as a controlled target device, and establishes a connection to a communications module of the controlled target device.

The communications module provides a communications service for a user on a network that needs to transfer a file or access information in a remote system or on a remote network by using a remote communications link.

Each terminal device may create a communications module of its own, to implement a wireless communications connection to the intelligent device.

Using an example in which a mobile phone controls a computer in a WiFi network, the mobile phone searches for a communications module of the computer in the same WiFi network. If the search succeeds, the intelligent device connects to the communications module by means of WiFi Direct.

When a wireless connection is established, the following scheme may be specifically used:

sending a connection request to the communications module of the computer by the mobile phone when the mobile phone finds the communications module of the computer in the wireless network; and returning a connection response message to the mobile phone by the communications module of the computer according to the connection request, so as to establish a wireless connection between the mobile phone and the communications module of the computer.

Step S102. The intelligent device determines whether a control protocol of the intelligent device is consistent with a control protocol of the target device when the intelligent device and the target device are in a connected state.

In an embodiment of the present application, to control the target device by using the intelligent device, cooperation between the target device and the intelligent device needs to be ensured to implement a corresponding control function. For example, control protocols need to be respectively set on the intelligent device and the target device. For example, the control protocol set on the intelligent device includes an encoding format of an input instruction and a version of the control protocol. The control protocol set on the target device includes a decoding format and a version of the control protocol. Before performing control, the intelligent device needs to determine whether the encoding format in the control protocol of the intelligent device matches the decoding format on the target device, and whether the versions of the two control protocols are compatible, so as to perform a control operation subsequently.

In an embodiment of the present application, the method further includes: obtaining, by the intelligent device, a type of the target device after selecting the target device.

In this embodiment, corresponding operation control interfaces are set in advance according to different types of terminal devices. For example, an operation control interface for a computer may be an actual display interface of the computer. For another example, considering that an air conditioner has no display interface, a default operation control interface may be used.

After the type of the target device is obtained, type matching is performed on the selected target device according to the type of the target device and preset mappings between device types and operation control interfaces, to obtain an operation control interface for the target device.

Thereafter, an operation control panel is displayed on the intelligent device, for the user to input an operation instruction. The operation control panel displayed on the intelligent device may be shown in FIG. 5. On the operation control panel, a touch area may be displayed, and a left button, a right button, and a wheel of a mouse may be simulated to operate the computer.

Step S103. The intelligent device receives an input instruction when the control protocol of the intelligent device is consistent with the control protocol of the target device.

Step S104. The intelligent device performs operation control on the selected target device according to the input instruction of the user.

The input instruction of the user is received on the corresponding operation control interface, and the input instruction of the user is sent to the communications module of the terminal device by using the wireless connection, to perform operation control on the terminal device.

The intelligent device receives, on the displayed operation control panel, the operation instruction input by the user.

The input instruction of the user may include: a touch operation, a click operation, data obtained by a gravity sensor, data obtained by a light sensor, data obtained by a gyroscope, a sound, an image captured by a camera, or the like.

The intelligent device sends the input instruction of the user to the communications module of the terminal device by using the wireless connection, to perform operation control on the terminal device.

Figure 5:
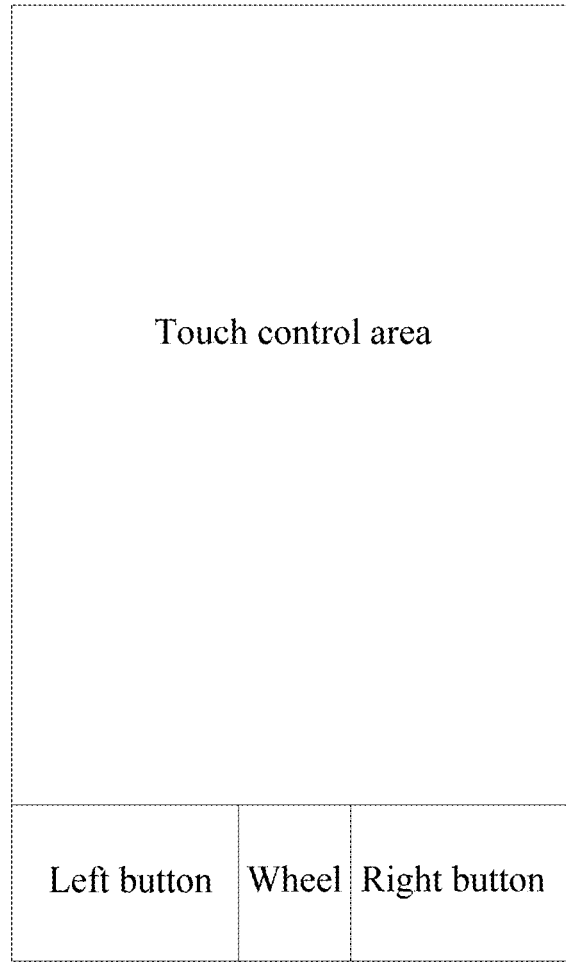
FIG. 5 is a schematic diagram of an operation control panel displayed on an intelligent device in an embodiment of this application.

On the operation control panel shown in FIG. 5, using a single left click as an example, after a single click instruction is transferred to the computer by using the steps in the foregoing solution, a WM_LBUTTONDOWN message is sent to a currently activated window on the windows computer, and after processing the message, the window performs a corresponding click operation. For example, when a URL link is clicked, the link is opened.

By means of the solution in this embodiment, an intelligent device selects a target device in a wireless local area network; performs type matching on the selected target device, and presents a corresponding operation control interface according to a matching result; receives an input instruction of a user on the corresponding operation control interface; and performs operation control on the selected target device according to the input instruction of the user. In this way, effective control on a terminal device is implemented by using an intelligent device, and a requirement of a user for flexible intelligent control on the terminal device is satisfied.

Figure 6:
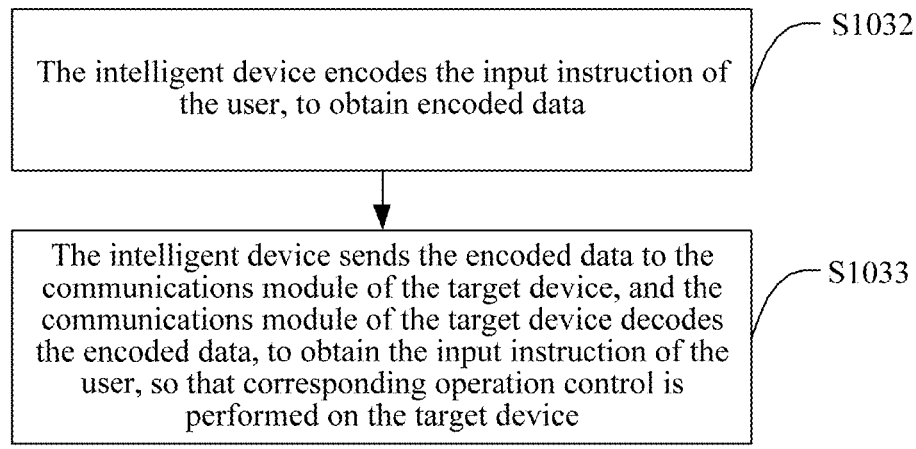
FIG. 6 is a flowchart of performing operation control on a selected target device according to an input instruction of a user in an embodiment of this application.

Further, based on the foregoing embodiment, in an implementation, as shown in FIG. 6, the foregoing step S104: The intelligent device performs operation control on the selected target device according to the input instruction of the user may include:

Step S1032. The intelligent device encodes the input instruction of the user, to obtain encoded data.

In an embodiment of the present application, an input apparatus, for example, an input button, corresponding to each operation of the target device is set on the intelligent device. For example, corresponding to an operation of increasing a volume of a player on the computer, a button that controls a volume increase is set on the intelligent device. When the button is triggered, the intelligent device collects the input signal. The intelligent device encodes the input signal according to the control protocol of the intelligent device, to obtain the encoded data.

Step S1033. The intelligent device sends the encoded data to the communications module of the target device, and the communications module of the target device decodes the encoded data, to obtain the input instruction of the user, so that corresponding operation control is performed on the target device.

Correspondingly, the target device searches, in the control protocol of the target device that is consistent with the control protocol of the intelligent device, a preset action encoding mapping table storing correspondences between input instructions and encoded data, and after finding the input instruction, calls an API function, and performs, according to the input instruction, an operation of increasing a volume.

Specifically, after receiving the input instruction of the user, the intelligent device encodes the input instruction of the user. An encoding process is mapping a specific input action to a code formed by using a character, a digit, and the like, to uniquely identify the action, and adding information according to different types of operations. A specific encoding format may be shown in the following Table 1.

TABLE 1

| Operation type | Operation code | Additional operation information |
|---|---|---|
| Single click operation on a screen | click | Coordinates (x, y) of a position of the single click on the screen |
| Touch gesture on a screen | touch | Position coordinates sequence {(x1, y1), (x2, y2), . . . , (xn, yn)} |

By encoding the input instruction of the user, data transmission efficiency can be improved.

Thereafter, the intelligent device sends the code of the user input to the communications module of the target device such as the computer by means of WiFi Direct.

Figure 7:
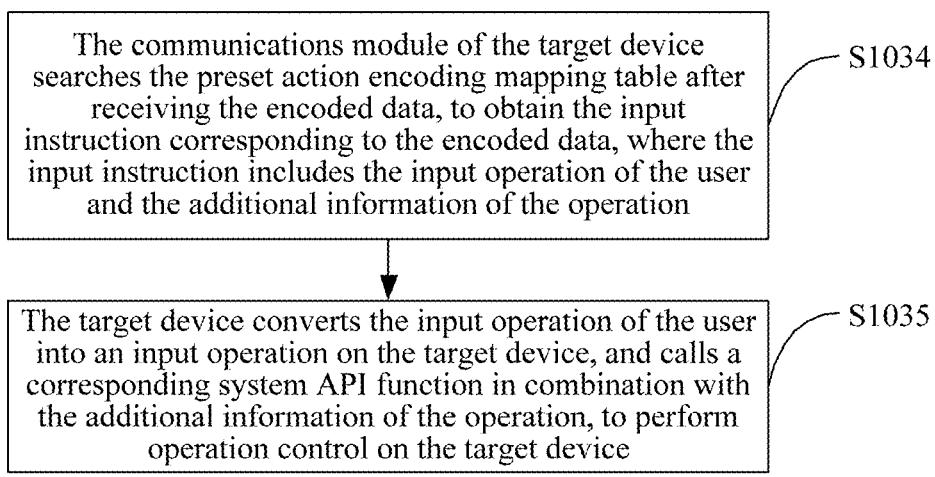
FIG. 7 is a flowchart of decoding encoded data by a communications module of a target device, to obtain an input instruction of a user, so that corresponding operation control is performed on the target device in an embodiment of this application.

Based on the foregoing embodiment, in an implementation, as shown in FIG. 7, the step of decoding the encoded data by the communications module of the target device, to obtain the input instruction of the user, so that the corresponding operation control is performed on the target device may include:

Step S1034. The communications module of the target device searches the preset action encoding mapping table after receiving the encoded data, to obtain the input instruction corresponding to the encoded data, where the input instruction includes the input operation of the user and the additional information of the operation.

Step S1035. The target device converts the input operation of the user into an input operation on the target device, and calls a corresponding system API function in combination with the additional information of the operation, to perform operation control on the target device.

Specifically, using an example in which the target device is a computer, after receiving the encoded data, a communications module of the computer searches an action encoding mapping table at the input, and obtains the user input operation represented by the code and the additional information of the operation. Then, the computer converts the operation input by the user by using the intelligent device into an input operation on the computer, and finally implements corresponding control on the computer by calling a corresponding system application programming interface (API) function. For example, a file on the computer may be opened or the computer may be shut down by using a touchscreen mobile phone and using a finger as a mouse.

In an embodiment of the present application, same input instructions are converted into same encoded data, to control different target devices to perform a same operation in a same application. For example, the intelligent device encodes a "single click operation on a screen" into encoded data "click", and a computer and a television both convert the encoded data "click" into a "single click operation on a screen", to perform an operation of playing a program in a player.

By means of the foregoing solution in this embodiment, an input operation of a user on an intelligent device is converted into an input operation on a terminal device, thereby implementing effective intelligent control on the terminal device such as a computer by using the intelligent device, and satisfying a requirement of a user. In this embodiment of the present application, a same application program on multiple terminal devices can be controlled by using one intelligent device, and efficiency of control on the terminal devices can therefore be improved.

The solution in this embodiment of this application is explained in detail below by using an example in which a computer is controlled by using a mobile phone and by referring to FIG. 8.

Figure 8:
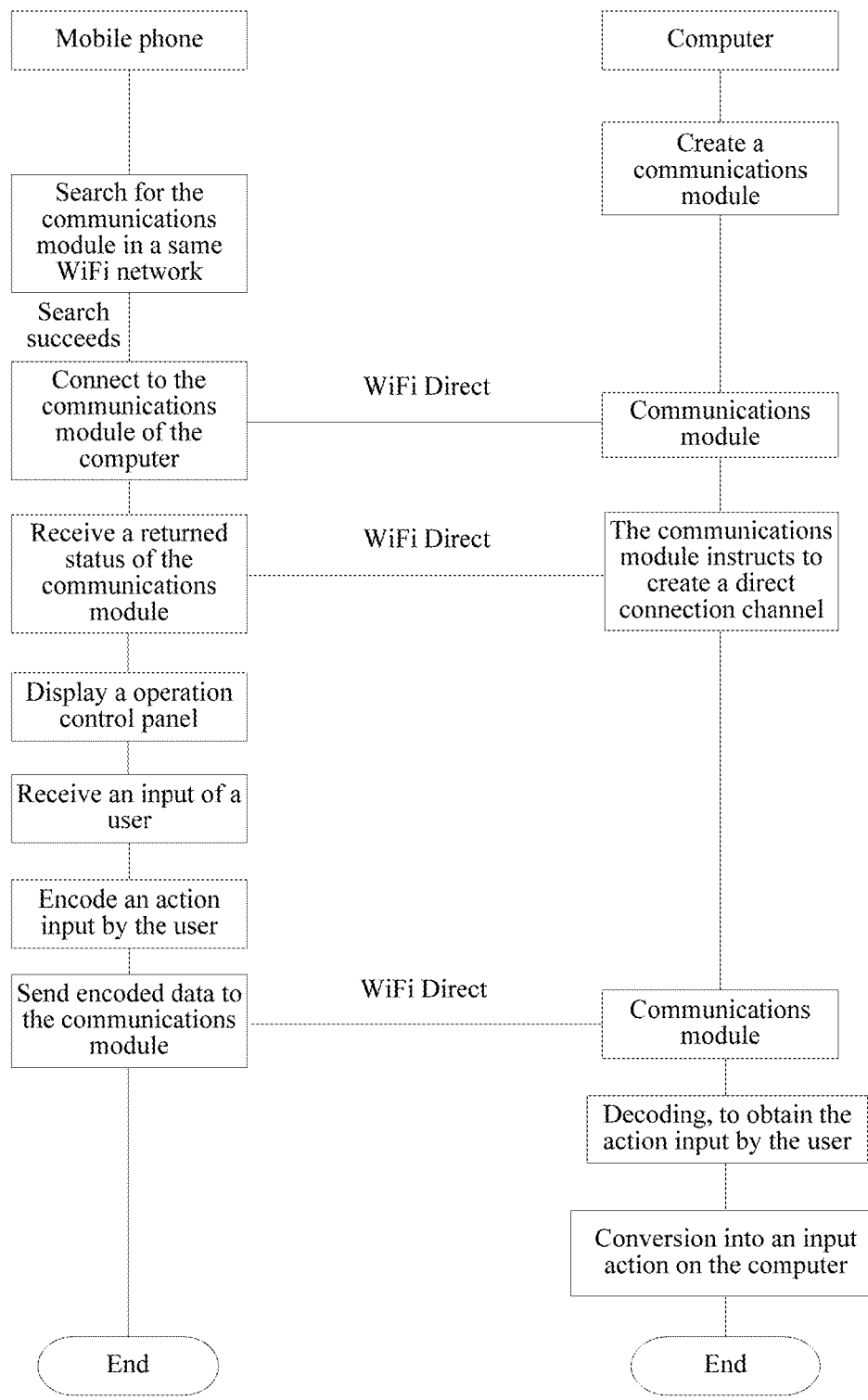
FIG. 8 is a flowchart of an example in which a computer is controlled by using a mobile phone in an embodiment of this application.

As shown in FIG. 8, a process in which a computer is controlled by using a mobile phone is as follows:

1. The mobile phone searches for a communications module in a same WiFi network. If the search succeeds, the mobile phone connects to the communications module by means of WiFi Direct.

2. After the mobile phone successfully establishes a connection to the communications module, the mobile phone displays a corresponding operation control panel.

3. The mobile phone receives a user input, where the user input may include: a touch operation, a click operation, data obtained by a gravity sensor, data obtained by a light sensor, data obtained by a gyroscope, a sound, an image captured by a camera, or the like.

4. The mobile phone encodes the user input (Encoding is mapping a specific input action to a code formed by using a character, a digit, and the like, to uniquely identify the action, and adding information according to different types of operations), and sends a code of the user input to the communications module of the computer by means of WiFi Direct.

5. After receiving the encoded data, the computer obtains, by searching an action encoding mapping table at the input, a user input operation represented by the code, and additional information of the operation.

6. The computer coverts the operation input by the user by using the mobile phone into an input operation on the computer, and controls the computer by calling a corresponding system API function.

A use scenario is described as an example as follows:

A mobile phone generally has best portability, whereas a large computing device such as a desktop computer is generally fixed at a particular position. Sometimes a user is out while the computer is at home, but the user needs materials on the computer, or the user lies on the bed and plays with a mobile phone, and does not want to get out of bed to shut down the computer. In this case, the user may use the mobile phone to control to shut down the computer by using the foregoing solution.

Therefore, by virtue of the advantage of simple operation of the mobile phone, and by using a touch operation and simulating an operation of a mouse, various operations such as opening a file on the computer and shutting down the computer can be performed, providing convenience to the user in remotely manipulating the computer by using the mobile phone.

On the operation control panel shown in FIG. 5, using a single left click as an example, after a single click instruction is transferred to the computer by using the steps in the foregoing solution, a WM_LBUTTONDOWN message is sent to a currently activated window on the computer, and after processing the message, the computer performs a corresponding operation. For example, when a URL link is clicked, the link is opened.

Figure 9:
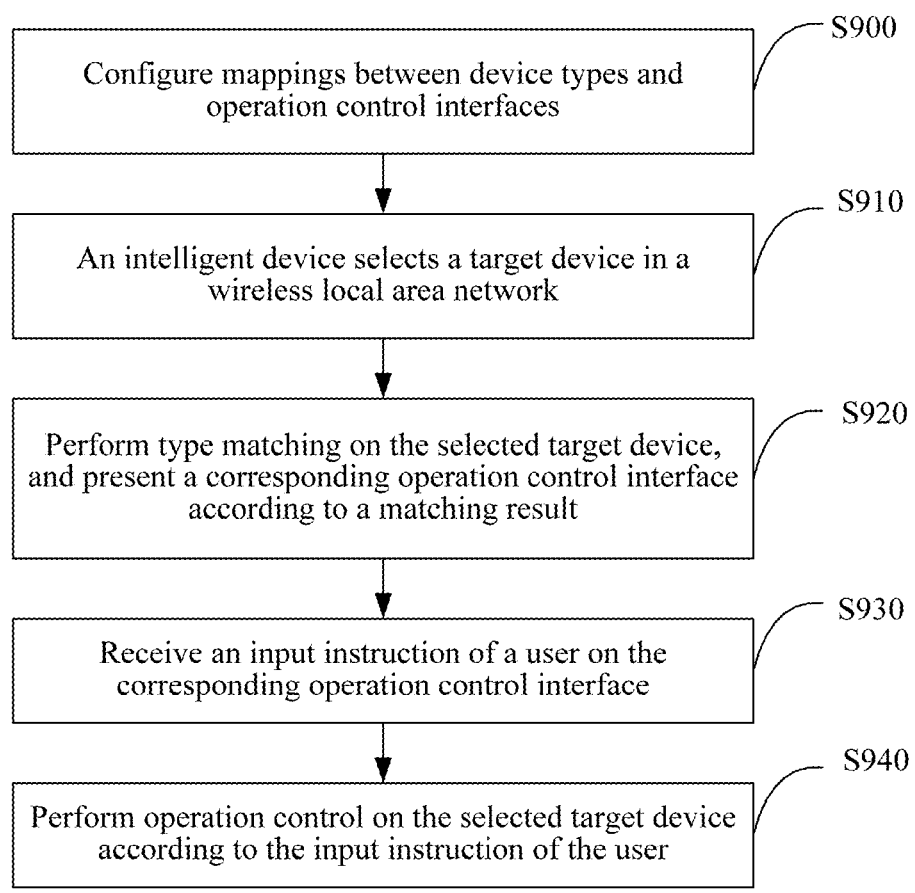
FIG. 9 is a flowchart of an embodiment of a method for controlling a terminal device by using an intelligent device according to this application.

As shown in FIG. 9, an embodiment of this application provides a method for controlling a terminal device by using an intelligent device. Before the foregoing step S910: The intelligent device selects the target device in the wireless local area network, the method in FIG. 9 includes:

Step S900. The intelligent device configures the mappings between device types and operation control interfaces.

Specifically, in this embodiment, corresponding operation control interfaces are set according to different types of terminal devices, and corresponding mappings are formed. For example, an operation control interface for a computer may be an actual display interface of the computer. For another example, considering that an air conditioner has no display interface, a default operation control interface may be used.

Subsequently, Step S920: after the type of the target device is obtained, type matching is performed on the selected target device according to the type of the target device and the preset mappings between device types and operation control interfaces, to obtain the operation control interface of the target device. Step S930: Receive an input instruction of a user on the corresponding operation control interface, and step S940: perform operation control on the selected target device according to the input instruction of the user.

In this embodiment, by configuring the mappings between device types and operation control interfaces, convenience and flexibility of operations on the terminal device are improved.

Correspondingly, an embodiment of functional modules of an intelligent device for controlling a terminal device according to this application is provided.

Figure 10:
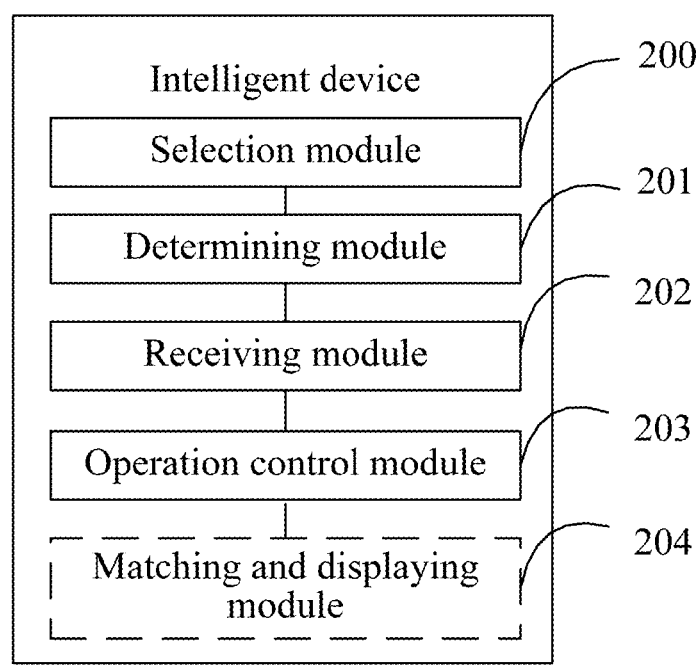
FIG. 10 is a schematic diagram of functional modules of an embodiment of an intelligent device controlling a terminal device according to this application.

As shown in FIG. 10, a preferable embodiment of this application provides an intelligent device for controlling a terminal device, including a selection module 200, a determining module 201, a receiving module 202, and an operation control module 203.

The selection module 200 is configured to traverse prestored correspondences between control triggering requests and terminal devices in response to a control triggering request, to search multiple terminal devices for a target device corresponding to the control triggering request.

The determining module 201 is configured to determine whether a control protocol of the intelligent device is consistent with a control protocol of the target device when the intelligent device and the target device are in a connected state.

The receiving module 202 is configured to receive an input instruction when the control protocol of the intelligent device is consistent with the control protocol of the target device.

The operation control module 203 is configured to perform operation control on the selected target device according to the input instruction.

In an embodiment of the present application, the intelligent device further includes a matching and displaying module 204, configured to: perform type matching on the selected target device, and present a corresponding operation control interface according to a matching result.

The receiving module 202 is configured to receive the input instruction on the operation control interface.

Specifically, the intelligent device may select one terminal device from terminal devices in a same local area network as the target device according to a need of a user for controlling a terminal device.

When selecting the target device, the intelligent device may obtain a communications module of the target device by means of searching, to establish a communication connection to the target device.

The communications module provides a communications service for a user on a network that needs to transfer a file or access information in a remote system or on a remote network by using a remote communications link.

Each terminal device may create a communications module of its own, to implement a wireless communications connection to the intelligent device.

Using an example in which a mobile phone controls a computer in a WiFi network, the mobile phone searches for a communications module of the computer in the same WiFi network. If the search succeeds, the intelligent device connects to the communications module by means of WiFi Direct.

When a wireless connection is established, the following scheme may be specifically used:

sending a connection request to the communications module of the computer by the mobile phone when the mobile phone finds the communications module of the computer in the wireless network; and returning a connection response message to the mobile phone by the communications module of the computer according to the connection request, so as to establish a wireless connection between the mobile phone and the communications module of the computer.

After selecting the target device, the intelligent device obtains a type of the target device.

In this embodiment, corresponding operation control interfaces are set in advance according to different types of terminal devices. For example, an operation control interface for a computer may be an actual display interface of the computer. For another example, considering that an air conditioner has no display interface, a default operation control interface may be used.

After the type of the target device is obtained, type matching is performed on the selected target device according to the type of the target device and preset mappings between device types and operation control interfaces, to obtain an operation control interface for the target device.

Thereafter, an operation control panel is displayed on the intelligent device, for the user to input an operation instruction. The operation control panel displayed on the intelligent device may be shown in FIG. 5. On the operation control panel, a touch area may be displayed, and a left button, a right button, and a wheel of a mouse may be simulated to operate the computer.

The input instruction of the user is received on the corresponding operation control interface, and the input instruction of the user is sent to the communications module of the terminal device by using the wireless connection, to perform operation control on the terminal device.

The intelligent device receives, on the displayed operation control panel, the operation instruction input by the user.

The input instruction of the user may include: a touch operation, a click operation, data obtained by a gravity sensor, data obtained by a light sensor, data obtained by a gyroscope, a sound, an image captured by a camera, or the like.

The intelligent device sends the input instruction of the user to the communications module of the terminal device by using the wireless connection, to perform operation control on the terminal device.

On the operation control panel shown in FIG. 5, using a single left click as an example, after a single click instruction is transferred to the computer by using the steps in the foregoing solution, a WM_LBUTTONDOWN message is sent to a currently activated window on a windows computer, and after processing the message, the window performs a corresponding click operation. For example, when a URL link is clicked, the link is opened.

By means of the solution in this embodiment, the intelligent device selects a target device in a wireless local area network; performs type matching on the selected target device, and presents a corresponding operation control interface according to a matching result; receives an input instruction of a user on the corresponding operation control interface; and performs operation control on the selected target device according to the input instruction of the user. In this way, effective control on a terminal device is implemented by using an intelligent device, and a requirement of a user for flexible intelligent control on the terminal device is satisfied.

Figure 11:
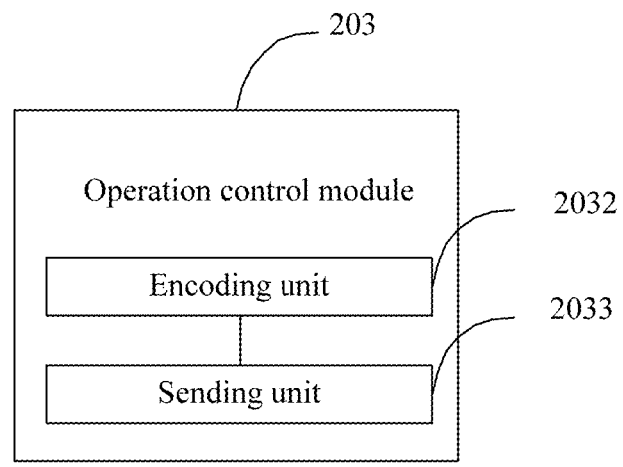
FIG. 11 is a schematic diagram of a functional structure of an operation control module in an embodiment of this application.

Further, based on the foregoing embodiment, in an implementation, as shown in FIG. 11, the operation control module 203 further includes an encoding unit 2032 and a sending unit 2033.

The encoding unit 2032 is configured to encode the input instruction according to the control protocol of the intelligent device, to obtain encoded data.

The sending unit 2033 is configured to: send the encoded data to a communications module of the target device, so that the communications module of the target device decodes the encoded data according to the control protocol of the target device, to obtain the input instruction, so that the operation of the target device is performed.

Specifically, after receiving the input instruction of the user, the intelligent device encodes the input instruction of the user. An encoding process is mapping a specific input action to a code formed by using a character, a digit, and the like, to uniquely identify the action, and adding information according to different types of operations. A specific encoding format may be shown in Table 1 above.

By encoding the input instruction of the user, data transmission efficiency can be improved.

Thereafter, the intelligent device sends the code of the user input to the communications module of the target device such as the computer by means of WiFi Direct.

Specifically, using an example in which the target device is a computer, after receiving the encoded data, a communications module of the computer searches an action encoding mapping table at the input, and obtains the user input operation represented by the code and the additional information of the operation. Then, the computer converts the operation input by the user by using the intelligent device into an input operation on the computer, and finally implements corresponding control on the computer by calling a corresponding system application programming interface (API) function. For example, a file on the computer may be opened or the computer may be shut down by using a touchscreen mobile phone and using a finger as a mouse.

By means of the foregoing solution in this embodiment, an input operation of a user on an intelligent device is converted into an input operation on a terminal device, thereby implementing effective intelligent control on the terminal device such as a computer by using the intelligent device, and satisfying a requirement of a user.

Figure 12:
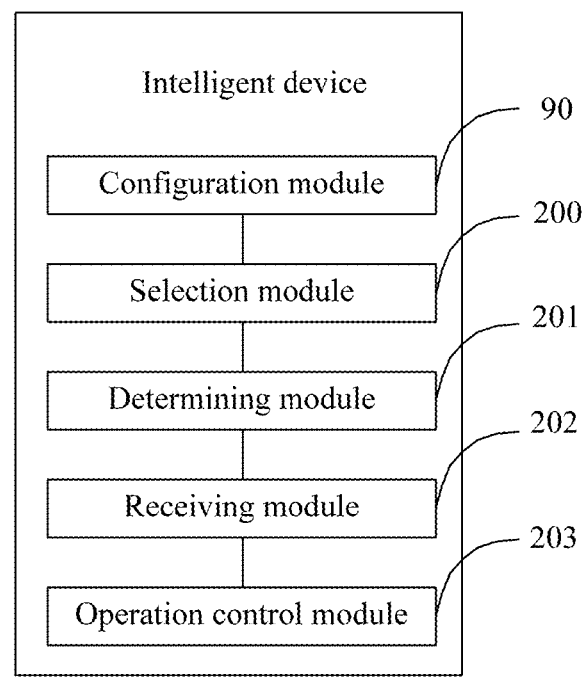
FIG. 12 is a schematic diagram of functional modules of an embodiment of an intelligent device controlling a terminal device according to this application.

As shown in FIG. 12, an embodiment of this application provides an intelligent device for controlling a terminal device. Based on the embodiment shown in the foregoing FIG. 10, the intelligent device further includes:

a configuration module 90, configured to configure the mappings between device types and operation control interfaces.

Specifically, in this embodiment, corresponding operation control interfaces are set according to different types of terminal devices, and corresponding mappings are formed. For example, an operation control interface for a computer may be an actual display interface of the computer. For another example, considering that an air conditioner has no display interface, a default operation control interface may be used.

Subsequently, after the type of the target device is obtained, type matching is performed on the selected target device according to the type of the target device and the preset mappings between device types and operation control interfaces, to obtain the operation control interface of the target device.

In this embodiment, by configuring the mappings between device types and operation control interfaces, convenience and flexibility of operations on the terminal device are improved.

Figure 13:
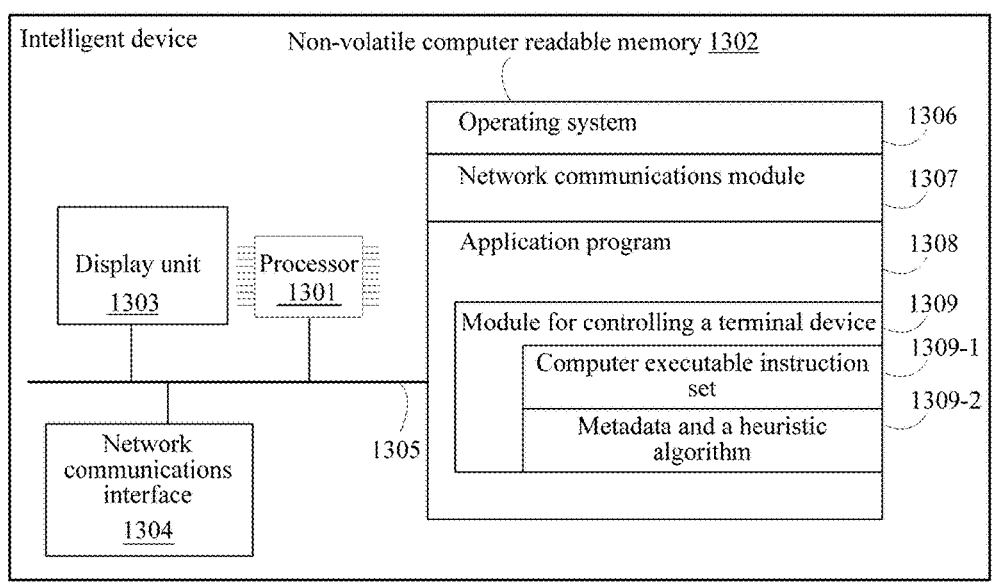
FIG. 13 is a schematic structural diagram of an intelligent device according to this application.

FIG. 13 is a schematic structural diagram of an intelligent device according to this application.

The device includes a processor 1301, a non-volatile (or non-transitory) computer readable memory 1302, a display unit 1303, a network communications interface 1304. These components communicate by using a bus 1305.

In this embodiment, multiple program modules are stored in the memory 1302, including an operating system 1306, a network communications module 1307, and an application program 1308.

The processor 1301 may read various modules (not shown in the figure) included in the application program in the memory 1302, to perform various functional applications and data processing of the device for controlling a terminal device. There may be one processor 1301 or multiple processors 1301 in this embodiment, and the processor 1301 may be a CPU, a processing unit/module, an ASIC, a logic module, a programmable gate array, or the like.

The operating system 1306 may be a Windows operating system, an Android operating system, or an Apple iPhone operating system.

The application program 1308 may include a module 1309 for controlling a terminal device. The module 1309 for controlling a terminal device may include a computer executable instruction set 1309-1 formed by the functional modules in the devices shown in FIG. 10 and FIG. 12, and corresponding metadata and a heuristic algorithm 1309-2. The computer executable instruction set may be executed by the processor 1301 to perform the methods shown in FIG. 4 and FIG. 9 or the functions of the devices shown in FIG. 10 and FIG. 12.

In this embodiment, the network communications interface 1304 cooperates with the network communications module 1307 to complete receiving and sending of various network signals of the device for controlling a terminal device.

The display unit 1303 has a display panel, configured to complete input and display of related information.

If the device for controlling a terminal device has no communications requirement, the device for controlling a terminal device may also not include the network communications interface 1304 and the network communications module 1307.

In addition, for a system for controlling a terminal device provided in an embodiment of this application, refer to the system architecture shown in FIG. 1. For a basic principle of controlling a terminal device by using an intelligent device thereof, refer to the foregoing embodiments, and details are not described herein again.

It should be further noted that, in this specification, the term "include", "contain", or any other variant is intended to encompass non-exclusive include, so that a process, a method, an article, or a device including a series of elements not only includes those elements, but also includes other elements not explicitly listed, or further includes elements inherent in the process, the method, the article, or the device. Without other limitations, for an element defined by the statement "includes a . . . ", it is not excluded that there are other same elements in a process, a method, an article, or a device including the element.

The serial numbers of the foregoing embodiments of this application serve for a description purpose only, and do not indicate the preference of the embodiments.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, essentials or parts contributing to the prior art of the technical solutions of this application may be embodied in the form of a software product. The computer software product is stored in a storage medium (for example, a ROM/RAM, a magnetic disk, or an optical disk), and includes several instructions to cause a terminal device (which may be a mobile phone, a computer, a server, or a network device) to execute the method described in the embodiments of this application.

What is described above is merely preferable embodiments of this application, and does not thereby limit the patentable scope of this application. Equivalent structures or process variations made by using the content in the specification or the accompanying drawings in this application, whether directly or indirectly applied to other related technical fields, are similarly covered by the patent protection scope of this application.

What is claimed is:

1. A method for controlling a terminal device, comprising:
in response to a control triggering request, traversing, by an intelligent device comprising a memory and a processor in communication with the memory, pre-stored correspondences between control triggering requests and terminal devices, to search multiple terminal devices for a target device corresponding to the control triggering request;
determining, by the intelligent device, whether a control protocol of the intelligent device is consistent with a control protocol of the target device when the intelligent device and the target device are in a connected state;
when it is determined that the control protocol of the intelligent device is consistent with the control protocol of the target device, receiving, by the intelligent device, an input instruction and performing, by the intelligent device, operation control on the target device according to the input instruction;
obtaining, by the intelligent device, a device type of the target device;
determining, by the intelligent device, whether the device type is a device with no operation interface;
in response to the determination that the device type is the device with no operation interface, setting, by the intelligent device, a default operation control interface as the corresponding operation control interface; and
performing, by the intelligent device, type matching on the target device according to the device type of the target device and preset correspondences between device types and operation control interfaces, to obtain and display the corresponding operation control interface of the target device.

2. The method according to claim 1, wherein, when it is determined that the control protocol of the intelligent device is consistent with the control protocol of the target device, the receiving the input instruction comprises:
receiving, by the intelligent device, the input instruction on the corresponding operation control interface.

3. The method according to claim 1, wherein:
the receiving the input instruction comprises:
collecting, by the intelligent device, the input instruction when the intelligent device receives a trigger operation of an input apparatus corresponding to an operation of the target device; and
the performing the operation control on the target device according to the input instruction comprises:
encoding, by the intelligent device, the input instruction according to the control protocol of the intelligent device, to obtain encoded data,
sending, by the intelligent device, the encoded data to a communications module of the target device, so that the communications module of the target device is configured to decode the encoded data according to the control protocol of the target device, to obtain the input instruction, so that the operation of the target device is performed.

4. The method according to claim 3, wherein, when the communications module of the target device is configured to decode the encoded data according to the control protocol of the target device, to obtain the input instruction, so that the operation of the target device is performed, the method comprises:
searching, by the communications module of the target device in the control protocol of the target device, a preset action encoding mapping table after receiving the encoded data, to obtain the input instruction corresponding to the encoded data, wherein the input instruction comprises an input operation and additional information of the input operation;
converting the input operation comprised in the input instruction into an input operation on the target device;
calling a corresponding system application programming interface (API) function in combination with the additional information of the input operation, and running the corresponding system API function to perform the operation of the target device.

5. The method according to claim 1, wherein the intelligent device and the target device communicate by using a cable.

6. The method according to claim 5, wherein the intelligent device and the target device are also connected through a wireless network.

7. The method according to claim 1, wherein the intelligent device and the target device communicate by using a wireless network.

8. An intelligent device for controlling a terminal device, comprising:
a memory storing instructions;
a processor in communication with the memory, wherein, when the processor executes the instructions, the processor is configured to cause the intelligent device to:
traverse, in response to a control triggering request, pre-stored correspondences between control triggering requests and terminal devices, to search multiple terminal devices for a target device corresponding to the control triggering request;
determine whether a control protocol of the intelligent device is consistent with a control protocol of the target device when the intelligent device and the target device are in a connected state;
when it is determined that the control protocol of the intelligent device is consistent with the control protocol of the target device, receive an input instruction, and perform operation control on the target device according to the input instruction;
obtain a device type of the target device;
determine whether the device type is a device with no operation interface;
in response to the determination that the device type is the device with no operation interface, set a default operation control interface as the corresponding operation control interface; and
perform type matching on the target device according to the device type of the target device and preset correspondences between device types and operation control interfaces, to obtain and display the corresponding operation control interface of the target device.

9. The intelligent device according to claim 8, wherein:
when the processor is configured to cause the intelligent device to receive the input instruction, the processor is configured to cause the intelligent device to:
collect the input instruction when receiving a trigger operation of an input apparatus corresponding to an operation of the target device; and
when the processor is configured to cause the intelligent device to perform the operation control on the target device according to the input instruction, the processor is configured to cause the intelligent device to:
encode the input instruction according to the control protocol of the intelligent device, to obtain encoded data, and send the encoded data to a communications module of the target device, so that the communications module of the target device is configured to decode the encoded data according to the control protocol of the target device, to obtain the input instruction, so that the operation of the target device is performed.

10. The intelligent device according to claim 8, wherein the intelligent device and the target device communicate by using a cable.

11. The intelligent device according to claim 10, wherein the intelligent device and the target device are also connected through a wireless network.

12. The intelligent device according to claim 8, wherein the intelligent device and the target device communicate by using a wireless network.

13. A system for controlling a terminal device by using an intelligent device, the system comprising:
multiple terminal devices; and
an intelligent device, comprising:
a memory storing instructions;
a processor in communication with the memory, wherein, when the processor executes the instructions, the processor is configured to cause the intelligent device to:
traverse, in response to a control triggering request, pre-stored correspondences between control triggering requests and terminal devices, to search multiple terminal devices for a target device corresponding to the control triggering request;
determine whether a control protocol of the intelligent device is consistent with a control protocol of the target device when the intelligent device and the target device are in a connected state;
when it is determined that the control protocol of the intelligent device is consistent with the control protocol of the target device, receive an input instruction, and perform operation control on the target device according to the input instruction;
obtain a device type of the target device;
determine whether the device type is a device with no operation interface;
in response to the determination that the device type is the device with no operation interface, set a default operation control interface as the corresponding operation control interface; and
perform type matching on the target device according to the device type of the target device and preset correspondences between device types and operation control interfaces, to obtain and display the corresponding operation control interface of the target device; and
wherein the target device is configured to:
create a communications module,
establish a connection to the intelligent device by using the communications module,
receive the input instruction sent by the intelligent device, and
perform the operation control according to the input instruction.

14. The system according to claim 13, wherein:
when the processor executes the instructions, the processor is configured to further cause the intelligent device to:
collect the input instruction when the intelligent device receives a trigger operation of an input apparatus corresponding to an operation of the target device,
encode the input instruction according to a control protocol of the intelligent device, to obtain encoded data, and
send the encoded data to the communications module of the target device; and
the target device is further configured to:
search, in a control protocol of the target device, a preset action encoding mapping table after receiving the encoded data by using the communications module, to obtain the input instruction corresponding to the encoded data, wherein the input instruction comprises an input operation and additional information of the input operation,
convert the input operation comprised in the input instruction into an input operation on the target device, and
call a corresponding system application programming interface (API) function in combination with the additional information of the input operation, and run the corresponding system API function to perform the operation of the target device.

* * * * *